Patented Oct. 24, 1933

1,931,646

UNITED STATES PATENT OFFICE 1,931,646

PROCESS OF MAKING CHLORINATED DERIVATIVES OF INDANTHRENE

Joyce H. Crowell, Pittsburgh, Pa., assignor to National Aniline & Chemical Company, Inc., New York, N. Y., a corporation of New York No Drawing. Original application June 16, 1924, Serial No. 720,288. Divided and this application January 6, 1932. Serial No. 585,161

9 Claims. (Cl. 260—31)

This invention relates to improvements in the manufacture and production of chlorine derivatives or substitution-products of N-dihydro-1.2.2'.1'-anthraquinonazine.

It has been heretofore proposed to produce derivatives of N-dihydro-1.2.2'.1'-anthraquinonazine, which is also known as indanthrene, by subjecting it in sulfuric acid solution to the action of chlorine at elevated temperatures.

I have found, in accordance with the present invention, that indanthrene can be successfully chlorinated with chlorine in the presence of sulfuric acid to produce superior products by carrying out the chlorination at temperatures lower than those heretofore employed. The resulting derivatives of indanthrene, in the azine, azhydrine or dihydroazine form, or in a mixture of these forms may contain as high as about 11 per cent. of chlorine and dye cotton from an alkaline vat in bright blue shades that are very resistant to the action of bleaching solutions. By controlling the extent of chlorination, less chlorinated derivatives can also be obtained. The present invention therefore permits the production of commercially valuable chlorinated indanthrenes by chlorination of indanthrene in the presence of sulfuric acid with chlorine. These commercial products are comprised chiefly of either monochlor- or of dichlor-indanthrene, or of mixtures of the same, and they may be either in the azine, azhydrine, or dihydro-azine form.

In the practice of the present invention, a well-agitated sulfuric acid solution or suspension of indanthrene is subjected to the action of chlorine, while maintaining the reaction mixture at a temperature not exceeding 50° C. and preferably between 15° and 50° C., until the desired amount of chlorine has been absorbed and a chlorinated indanthrene, or a derivative thereof, is produced which contains the desired percentage of chlorine and whose dyeings exhibit the desired shade and fastness toward bleaching solutions. The chlorine is preferably supplied to the reaction-mass at about, or somewhat in excess of, the maximum rate at which it is absorbed in order to effect the chlorination in the minimum time and also to avoid undue waste of excessive amounts of chlorine. The invention can be carried out at pressures equal to or greater than atmospheric pressures.

The maximum absorption rate is defined as that rate at which the greatest or maximum amount of chlorine is taken up and absorbed by the sulfuric acid solution or suspension of indanthrene in a unit period of time. Its value is definite and specific for each set of conditions and depends on the currently existing combination of such factors as: (a) the temperature and the pressure at which the reaction is carried out, (b) the rate at which new surface areas of the solution or suspension are exposed or brought into contact with chlorine, (c) the strength of the sulfuric acid, (d) the concentration of the chlorine and of the indanthrene solution or suspension, and (e) the purity of the indanthrene.

When the rate at which chlorine is brought into contact with the indanthrene solution or suspension is less than the maximum rate of absorption, the rate of chlorination is lowered and the total time required to effect a given amount of chlorination is prolonged. If the chlorine is added at a greater rate than the maximum absorption rate, an increase in the maximum rate of absorption does not occur and the excess chlorine either remains unused or is wasted. The maximum rate of chlorination depends directly on the maximum rate of absorption.

I have found that the rate of absorption increases, within limits, with an increase of temperature, of pressure, of the speed of agitation, of the strength of sulfuric acid, of the concentration of reacting substances, and of impurity of indanthrene. I have also found that the total amount of chlorine required to effect a given amount of chlorination decreases, within limits, as the temperature and as the strength of the sulfuric acid increases, and increases as the purity of indanthrene decreases.

Since chlorine can act as both an oxidizing and chlorinating agent on indanthrene in the presence of sulfuric acid with formation of the azine and azhydrine forms, it is desirable at the completion of chlorination to reduce these forms to the dihydro-azine form in order to obtain a product having a uniform color. This reduction may be carried out in any suitable manner. I have found that it can be easily carried out in the sulfuric acid solution by means of ferrous salts, such as, for example, ferrous sulfate. After the reduction is effected, the dyestuff is either separated by crystallization and filtration or the mass is poured into water and the dyestuff, which is precipitated in minute and uniform particles, is filtered off and the paste either dried or standardized to any desired strength.

The following specific example will further illustrate the invention, but it is understood that the invention is not limited thereto. The parts are by weight.

*Example:*—Dissolve 60 parts of indanthrene in 900 parts of well-stirred sulfuric acid of 66° Bé. strength at 50° C. in a suitable chlorination kettle equipped with cooling means and an agitator and connected with a vent. Into this solution, kept well agitated and maintained at a temperature between 15° and 50° C., and preferably at about 35° C., pass a current of chlorine, preferably through a diffuser, at a rate slightly in excess of that at which it is approximately absorbed, that is, about 85 to 90 per cent. or more of the chlorine passed in is absorbed. It is preferable that substantially all of the air in the apparatus be displaced by chlorine during the process. When a test sample shows the desired percentage of chlorine to be present, the addition of chlorine is discontinued, and the reaction-mass is poured into about 8000 parts of warm or cold water, the solution or suspension is heated to boiling and the precipitated coloring-matter is collected by filtration.

The degree or extent of chlorination may be determined by analysis, or it may be estimated with sufficient accuracy for most practical purposes by diluting a test sample with water, filtering, and either comparing the color of the precipitated dye with samples of known composition, or vatting the precipitate by means of an alkaline sodium hydrosulfite solution and comparing the dyeings on cotton for shade and resistance to bleaching solutions against similar dyeings made from dyes of known composition. The chlorination is usually completed when a sample of the mixture on dilution with water gives a precipitate which is of a bluish-green to greenish-yellow color.

The chlorindanthrene thus obtained is usually in the form of the azhydrine or azine, with possibly some dihydro-azine, or as a mixture of these forms. It may be purified and transformed to the dihydro-azine form in any suitable manner. For example, it may be treated with an alkaline sodium hydrosulfite solution and subsequently oxidized with air in the usual and well-known manner. Or the reaction-mass, after completion of the chlorination, may be heated with a reducing agent, such as, ferrous sulfate; for example, by adding ferrous sulfate to the reaction mass, or by adding the latter to a heated aqueous solution of ferrous sulfate.

In the above example, the time required to complete a chlorination to a desired extent will depend, among other things, very greatly on the efficiency of the agitation. The better the agitation, the less the time required. Less time, and a smaller amount of chlorine, also will be required to produce chlorinated indanthrenes of less chlorine content. Further, the time of chlorination will be considerably lessened if the reaction is conducted under pressures greater than atmospheric pressure.

It is to be understood that in the above example the proportions, concentrations, conditions of operation, etc., can be varied within comparatively wide limits without departing from the spirit and scope of the invention. For example, the strength of the sulfuric acid may vary from 85 to 100 per cent., sulfuric acid of 93 to 95 per cent. preferably being used, and the amount employed may be about 5 to 25 parts for each part of indanthrene taken. The temperature may vary from about 15° to about 50° C. Although the rate at which the chlorine is absorbed increases with an increase of the chlorination temperature, the quality of the resulting product decreases with an increase in the chlorination temperature, as is evidenced by a decrease in the brightness of the dyeings obtained from it. A temperature of between 30° and 40° C. is accordingly preferred in practice.

It is not necessary to pass the chlorine as a current or stream beneath the surface of the sulfuric acid since the chlorination is readily effected by simply bringing chlorine into contact with the surface of the solution provided said surface is well-agitated, and particularly if the chlorine be under pressure greater than atmospheric.

In place of indanthrene, its azine and azhydrine forms may be employed as initial material, and in place of pure indanthrene, the mixture of dyestuffs obtained according to U.S. Patents 682,523 or 724,789 may be employed. Further, chlorine derivatives of indanthrene containing a low percentage of chlorine can be converted by the present invention to higher chlorinated products, and the present invention includes within its scope the chlorination of such bodies, whether in the azine, azhydrine or dihydro-azine form. It will therefore be understood that where the expression "an indanthrene substance" is employed in the claims it denotes indanthrene and its lower chlorinated derivatives, whether in the dihydroazine or azhydrine form.

It will be thus seen that indanthrene, or its low chlorinated derivatives, in the azine, azhydrine or dihydroazine form, can be successfully and readily chlorinated in sulfuric acid to produce a commercial product; and that the extent or degree of chlorination can be readily controlled, thereby permitting the production of derivatives containing either a small amount of chlorine or a larger amount.

This application is a division of my co-pending application Serial No. 720,288, filed June 16, 1924, for process of making chlorinated derivatives of indanthrene, issued as U.S. Patent No. 1,847,330, March 1, 1932.

I claim:

1. In the production of a chlorine derivative of indanthrene, the process which comprises subjecting an indanthrene substance in the presence of sulfuric acid to the action of chlorine, while maintaining the reaction mixture at a temperature not exceeding 50° C.

2. In the production of a chlorine derivative of indanthrene, the process which comprises treating an indanthrene substance with chlorine in the presence of sulfuric acid of a strength of about 85 to 100 per cent., while maintaining the temperature of the reaction mixture between 15° and 50° C.

3. The method of chlorinating indanthrene which comprises subjecting indanthrene to the action of chlorine in the presence of sulfuric acid and at a temperature not exceeding 50° C.

4. The method of chlorinating indanthrene which comprises treating a well agitated mixture of indanthrene and sulfuric acid of a strength of about 85 to 100 per cent. with chlorine, maintaining the temperature of the reaction mixture between 15° and 50° C.

5. The method of chlorinating indanthrene which comprises introducing chlorine into a well agitated mixture of indanthrene with sulfuric acid of a strength of about 85 to 100 per cent., while maintaining the temperature of the reaction mixture between 30° and 40° C.

6. The method of chlorinating indanthrene which comprises supplying chlorine to a well agitated mixture of indanthrene with sulfuric acid of a strength of about 85 to 100 per cent. at substantially the maximum rate at which it is absorbed, while maintaining the temperature of the reaction mixture between 15° and 50° C.

7. The method of chlorinating indanthrene which comprises treating a well agitated mixture of indanthrene and sulfuric acid of a strength of about 93 to 95 per cent. with chlorine, while maintaining the temperature of the reaction mixture between 15° and 50° C.

8. The method of chlorinating indanthrene which comprises introducing chlorine into a well agitated mixture of indanthrene and sulfuric acid of a strength of about 93 to 95 per cent. at substantially the maximum rate at which it is absorbed, while maintaining the temperature of the reaction mixture between 30° and 40° C.

9. The method of chlorinating indanthrene which comprises introducing chlorine into a well agitated mixture of indanthrene and sulfuric acid of a strength of about 93 to 95 per cent., while maintaining the reaction mixture at a temperature of about 35° C.

JOYCE H. CROWELL.